United States Patent [19]

Hallerbäck

[11] 3,792,299
[45] Feb. 12, 1974

[54] STATOR FOR ELECTRIC MOTORS

[75] Inventor: Stig Lennart Hallerbäck, Vastra Frolunda, Sweden

[73] Assignee: SKF Industrial Trading and Development Company N.V., Amsterdam, Netherlands

[22] Filed: May 17, 1972

[21] Appl. No.: 254,302

[52] U.S. Cl. .............. 310/258, 310/43, 310/179
[51] Int. Cl. .............................................. H02k 1/12
[58] Field of Search ....... 310/179, 43, 45, 258, 254, 310/259, 185, 216–218, 194, 269

[56] References Cited
UNITED STATES PATENTS

| D3,539,853 | 11/1970 | Photiadis | 310/258 |
|---|---|---|---|
| 3,122,667 | 2/1064 | Baciu | 310/45 |
| 3,194,993 | 7/1965 | Hackney | 310/43 |
| 2,512,351 | 6/1950 | Lynn | 310/217 |
| 2,792,511 | 5/1957 | Horstman | 310/259 |
| 2,465,296 | 3/1943 | Swiss | 310/45 UX |
| 2,611,930 | 9/1952 | Hill | 310/45 |
| 2,922,902 | 1/1960 | Hargeaves | 310/45 |

*Primary Examiner*—R. Skudy
*Attorney, Agent, or Firm*—Howson & Howson; Eugene E. Renz, Jr.

[57] ABSTRACT

An electric rotary machine having a stator and a rotor, an annular air gap between the stator and the rotor, said stator comprising an outer annular yoke and a plurality of radially directed stator teeth circumferentially spaced apart to define a plurality of openings between adjacent teeth and extending the full radial depth of the teeth, stator windings in the openings between the stator teeth and a moulding adjacent axial ends of the stator forming an insulation for the stator windings and locating and holding together the stator teeth and stator windings as a rigid assembly, the inner ends of said teeth being formed with pointed tooth shoulders wherein adjacent shoulders are closely spaced apart to provide a narrow gap therebetween.

2 Claims, 14 Drawing Figures

PATENTED FEB 12 1974

STATOR FOR ELECTRIC MOTORS

The present invention relates to such stators for electric machines that are provided with an outer stator ring and stator teeth extending radially inwards from said stator rings, said teeth defining slots therebetween for receiving and locating the stator windings.

When manufacturing electric machines the stator unit in particular causes several difficult problems, some of which are insoluble with present production technics. The stator unit also represents a major portion of the production costs of the electric machine.

In almost all known electric machines the stator is made with stator slots open towards the rotor cavity, which have been punched out in the several stator plates. The object of making the slots open is to prevent the forming of a closed magnetic leak flux peripherally at the surface of the stator teeth adjacent the rotor cavity on one hand, and to make it possible to insert the windings, which is troublesome and time-consuming, on the other. Especially in small machines having relatively long stator bodies or a great number of pole slots, it can become necessary to insert the windings practically wire by wire. Any substantial mechanization of such a stator winding procedure is not possible. Further, that part of the winding situated beyond the ends of the stator core must often be made relatively large to make it possible to insert the windings, whereby the protruding ineffective part will contain a large amount of copper, which cannot be put to use electrically, and merely increases the dimensions and weight of the machine.

Technically the conventionally punched-out stator plate consists of a stator ring and stator teeth.

The stator teeth should for a proper magnetic flux have so shaped flanks that the least possible flux constriction occurs, and they should not have such projections that cause undesired flux leakage. The air gap which is formed between the stator teeth shall be as small as possible, that means, peripherally as narrow as possible and radially as shallow as possible. If so formed, the gap sets up the desired resistance to undesired magnetic flux leakage at the same time as the desired flux discontinuity minimally influences the magnetic field. The risk for over-tunes and over-waves is minimized and makes it possible to use a smaller air gap between the stator and rotor. These problems are explained more in detail in connection with FIG. 4 below. When the stator teeth are formed practically in conventional electric machines, regrettably the above said ideal can never be attained, since of course attention must be given to the arranging and fixing of the windings. This requires a relatively large air gap and so shaped flanks of the stator teeth, that wedges can be used for the fixation of the windings. This practical arrangement causes necessarily a substantial reduction of the capacity of the motor.

The stator construction according to the invention is indispensable for obtaining the dimensions of the air gap and track opening, which are required for attaining the above-mentioned result. The smaller air gap resistance gives a smaller no-load current which increases the motor power. Further, the saturation tendency in the thin flanks of the stator teeth can be kept down which futher decreases the flux reduction at the air gap.

When arranging the windings in the winding slots between the stator teeth it is desirable that the wires occupy the slot space as fully as possible and that they are concentrated radially as close to the rotor cavity as possible as this keeps down the radial height of the stator teeth, thus minimizing the iron losses. This cannot be optimized in concentionally wound stators as far as the location of the windings is concerned, because the loosely assembled windings with large end coils only fill the slots to 60 percent, at most, and further the necessary insulation, wedges and the shape of the stator teeth flanks displace the winding radially outwards increasing unduly the length of the stator teeth.

The air gap that separates the stator teeth has as mentioned a great importance from the magnetic flux point of view. Besides that said gap has a great influence on the noise level of the electric machine. If the gap is wide, strong air whirls and air pulsations occur when the rotor is rotating, and strongly influence the noise level. It is desirable to make this air gap very narrow. Some conventional stator units are formed with wide air gaps between the stator teeth to facilitate the winding procedure, and are equipped with wedges that at least partially occupy the space giving rise to noise. This is done to lower the noise level to an acceptable value. This arrangement means, however, a complication and it is always costly. The ideal is accordingly a stator unit having a completely smooth and cylindrical rotor cavity. This is not afforded by the conventional stator units.

When producing conventional stator plates or laminations, stator rings and stator teeth, it is desirable that these plates are punched with a circular and concentrical rotor cavity at the same time as the planeness of the plate is maintained. It is, however, impossible to obtain the desired dimensions and tolerances, primarily depending on the geometry of the stator plates having a relatively weak yoke portion and often long and flexible stator teeth. The shape is also negatively influenced by the fact that the sheet material has a certain lamination direction having a varying hardness and also thickness of the plate. In conventional assembly of the stator plates further deformations occur both circumferentially and axially of the stator core, the teeth of which thereby are often deformed to an irregular, somewhat tapering shape. These faults of the shape require machining which rises the costs and in some cases also reduces the capacity of the electric machine e.g., by short circuiting the stator plates, etc.

The operation of the electric machine can be further improved by subjecting the prefabricated stator teeth to a heat treatment before assembling. When the stator teeth are punched out, a substantial change of the metallurgic and magnetic properties of the plate will occur in the punching surface. This change gives rise to a magnetic eddy flux in the vicinity of the cutting surface. Such an eddy flux causes losses and as it is of different magnitude in different parts a certain disturbance of the operation of the motor will occur.

By heating the punched teeth to a temperature of the order of 800°C an equalization of the local tensions in the cutting surface of the plate will occur, and the magnetic properties are homogenized resulting in a minimized or eliminated eddy flux. During the punching operation burrs are formed on one side of the plate. These burrs have properties differing from those of the other parts of the plate, and this is not desirable. Such burrs are left in the finished machines on account of the costs which the removal thereof would entail.

The heat treatment according to the invention decreases the size of these burrs to some extent and also the difference in properties between the burrs and the plate proper.

The conventionally manufactured stator core is made of dynamo plates having a magnetic flux constant of $\mu$max 3000. However, a plate type exists having a directed flux, which is used in the manufacture of transformers. Such a plate can have a flux value up to $\mu$max 20 000. This plate is extremely valuable for stator construction. However, for conventional machines this is not possible as the $\mu$ value varies appreciably between the longitudinal direction of the plate and its transverse direction. This would give rise to varying resistance in the stator teeth. The motor would have a non-uniform operation. The costs for this flux orientated plate is furthermore so high that the conventionally very high waste proportion would assume a great economic importance. The waste percentage of the conventionally punched-out stator plates is very high, between 40 – 50 percent. A lowering of the this percentage to 10 – 20 percent would mean a most useful reduction of the materials cost, and, if technically possible, the additional cost of the flux oriented plate might become acceptable provided the waste percentage might be lowered accordingly.

One of the greatest problems in manufacturing conventional electric rotary machines resides in the difficulties encountered in making the air gap between the rotor and the stator very narrow. On the assumption that both the rotor and the stator cavity are cylindrical within close tolerances it is desirable to provide air gap dimensions which in small motors only are of the order of a few hundredths of a millimetre. A wider air gap will reduce the efficiency. In high-frequency motors this phenomenon becomes emphasized. In conventional stator structures the air gap should be so wide (0.2–0.3 millimetres) that the tolerances accepted in practice with regard to both the dimensions and the magnetic flux will not, in proportion to the air gap, have such a great influence that vibrations appear and the motor will operate non-uniformly.

The present invention relates to a stator and the method of manufacturing the same, which to a very great extent eliminate the drawbacks of a conventional stator which have been briefly gone into above. According to the invention the parts of the stator core forming stator teeth between the winding slots are made separately from the core, the surfaces determining the position of the teeth being provided at the inner end surfaces of the latter. Thus, during the winding procedure the slot spaces for the stator windings will be open radially outwards and after the winding procedure closed by a stator ring or yoke, whereafter a moulding together of winding, stator teeth and stator yoke is carried out by means of lacquer or molding compound to a rigidly assembled stator unit.

The advantages obtained with a stator according to the invention are very great. According to the proposed method a stator can be wound in the same way as a direct-current rotor, whereby the end windings can be brought to fit very closely to the ends of the stator core, and thus the winding procedure can be carried out much faster and more safely than by a conventional method. At the same time a lot of copper can be saved and the cost of stator plate packs as well as weight and dimensions can be reduced.

Moreover, all the above cited conventional problems are influenced positively from technical points of view. On the whole the electric machine will get better performance data and efficiency, and at the same time noise and vibration level will be reduced to a value which is not possible to obtain with the methods of manufacturing of the electric machines which are in current use today.

The invention will be described more in detail with reference to some embodiments which are shown in the enclosed drawings, in which.

Figure 1:
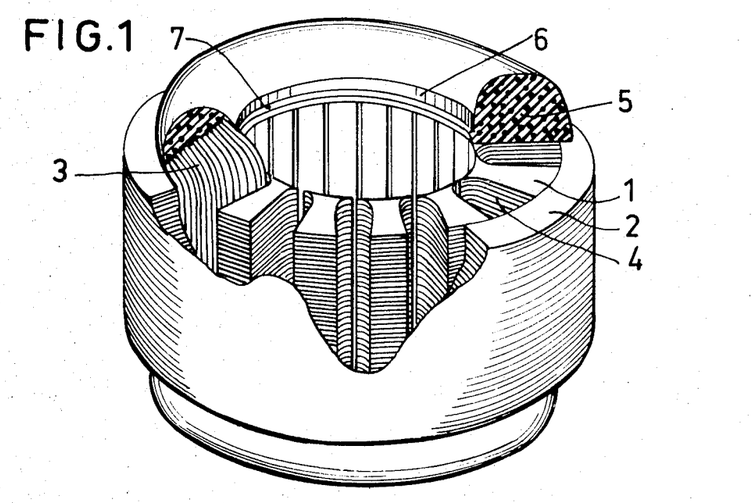
FIG. 1 is a perspective view, partly in section, of a stator.

FIG. 1 is a fragmentary section of a stator unit comprising a number of stator teeth 1, surrounded by a ring-shaped stator yoke 2. This stator yoke is mounted about the stator teeth after the winding 3 has been placed in the stator slots 4, formed between the stator teeth. After the above mentioned operations, which will be described more in detail below, the stator unit has been moulded together by means of lacquer or moulding compound 5, whereby the aligning and abutment surfaces 6 and 7 necessary for supporting the rotor also are formed. In the abovementioned example the stator teeth 1 as well as the ring-shaped yoke 2 consist of laminations. The stator teeth can get a shape optimized with regard to the magnetic flux, described more in detail in connection with FIG. 3. An optimal plate material can also be chosen, having a flux-oriented lamination. By the punching-out of the stator teeth, which is carried out with very small waste, there is used an automatic punching apparatus directly orienting the punched plates relative to each other. The plates are held together in assembled relation by means of lacquer, plastic moulding compound or adhesive tape during the procedure of assembly and winding, the plates finally being definitively moulded together into a unit consisting of stator teeth, stator yoke, winding and moulding compound.

Figure 2:
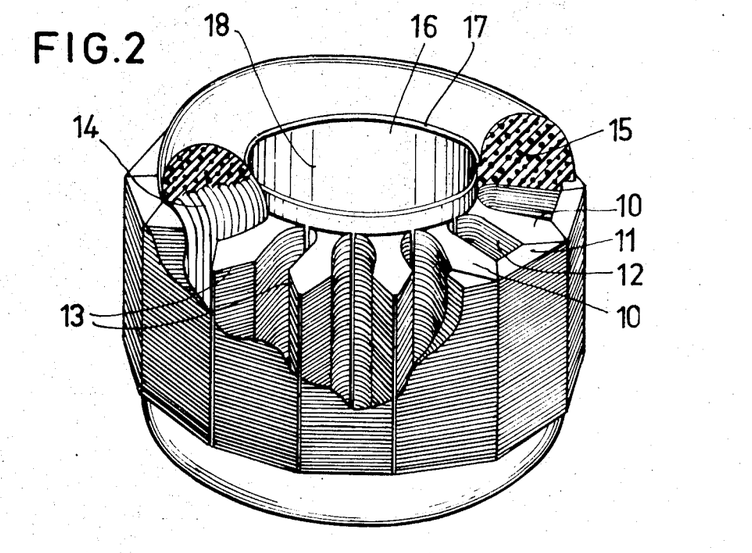
FIG. 2 is a perspective view of a second stator, partly in section.

FIG. 2, which is similar to FIG. 1, is a fragmentary section of the stator unit, the stator teeth 10 of which are formed in such a way that they fit against trapezoidal yoke elements 11. The latter close stator winding slots 12 at the outside at the same time as the yoke elements 11 engage the teeth 10 closely at the contact surfaces 13. Thus, in this embodiment the conventional ring-shaped stator yoke has been replaced by a polygonal yoke formed of as grat a number of yoke elements as the number of winding slots. The construction is described more in detail in connection with FIG. 7. By assembling the stator yoke of elements the separate yoke elements 11 can be punched out with very small waste and according to the same principles as the stator teeth 10. A very great advantage obtained by dividing the stator yoke in a plurality of elements is that one can advantageously use magnetic oriented lamination also in the stator yoke, whereby the efficiency of the motor is improved. After the winding 14 has been placed in the winding slots, the yoke elements 11 are inserted in their position, whereby they are kept together by means of provisional connections, e.g., lacquer- or tape-connections. The stator body assembled in this way is thereafter moulded together with lacquer or moulding compound 15 in a special moulding die so that the stator forms a solid unit consisting of winding, stator teeth and stator yoke. In this operation aligning and abutment surfaces 16 and 17 should be provided, suitable for supporting the rotor bearing units. In the example shown in FIG. 2, these surfaces are formed in connection with a very thin-walled sleeve 18 which furthermore provides a fastening surface for the stator teeth during the operations of assembling and winding. During these operations it is, however, engaged by a central mandrel device, described with reference to FIG. 13.

Figure 3:
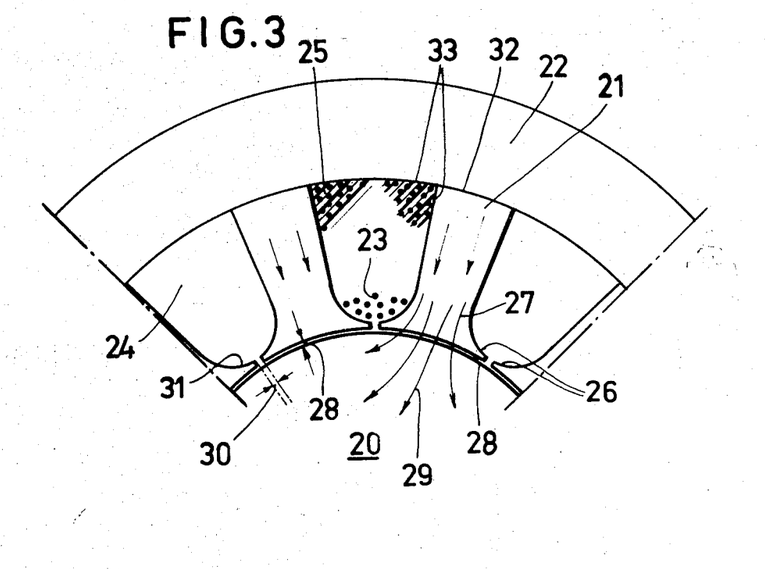
FIG. 3 illustrates the principles in building a stator structure.

FIG. 3 shows diagrammatically how the rotor 20 is surrounded by a stator portion consisting of the stator teeth 21 and surrounding ring-shaped yoke parts 22. The winding 23 is placed in the interspaces 24 formed between the stator teeth 21 and surrounding stator yoke 22. The lacquer mass 25 provides an interconnecting medium for stator teeth, winding and stator yoke. The stator teeth 21 are formed with such a flank profile 26, that an optimal magnetic flux is obtained through the stator tooth proper, see arrow 27, and when the magnetic flux passes the air gap 28 to the rotor 20, see flux arrows 29. The shape of the stator teeth at the air gap adjacent the rotor shall be such that the smallest possible magnetic flux leakage will occur between the teeth. The latter must not be in metallic contact with each other. However, it is desirable to make the spacing 30 as small as possible and to form the tooth shoulders 31 as low and pointed as possible. These dimensions can be kept because no regard need be taken to a conventionally necessary assembling gap, when the winding is mounted from the rotor cavity and outwards. The winding 23 can be wound much closer to the motor axis according to the invention compared with the conventionally wound motor. The latter must have a relatively high profile by 31 in order to resist the mounting of conventional wedges and winding pressure, and further must afford space for insulating materials. The winding, which according to the invention is located closer to the motor axis, improves the efficiency of the stator, because at the same time as the winding is displaced towards the axis, also the total height of the stator tooth is reduced. This, as well as the improved flank profile, provides an increased efficiency because the iron losses are reduced when the height of the teeth is reduced. Because the stator teeth by the final moulding-in are fixedly engaged against a central coaxial mandrel and because this mandrel also is formed with a concentric abutment surface for bearing support means, the rotor bearing will be coaxial with the stator teeth. This makes it possible to reduce the width of the air gap 28 to a minimum, typically 0.05 millimetres compared to the conventional 0.20 – 0.30 millimetres. This improves efficiency to a great extent. Thus, the shape and dimensions of the stator teeth according to the invention have an influence upon the efficiency and accordingly also upon the power output. Moreover, the efficiency may be still more increased if the conventional plate material ($\mu$max 3,000) of the stator teeth is replaced by magnetic oriented material with considerably improved magnetic characteristics ($\mu$max 20,000). This change may be carried out economically and practically by punching out the stator teeth 11 separately. Considerably smaller no-load losses have an influence upon the total dimensioning of the motor. The stator yoke 22 is moulded to the stator teeth with a good fit to the abutment surface 32, whereby the lacquer or moulding compound gets a good connection at the laminations 33 of the stator teeth and the stator yoke.

Figure 4:
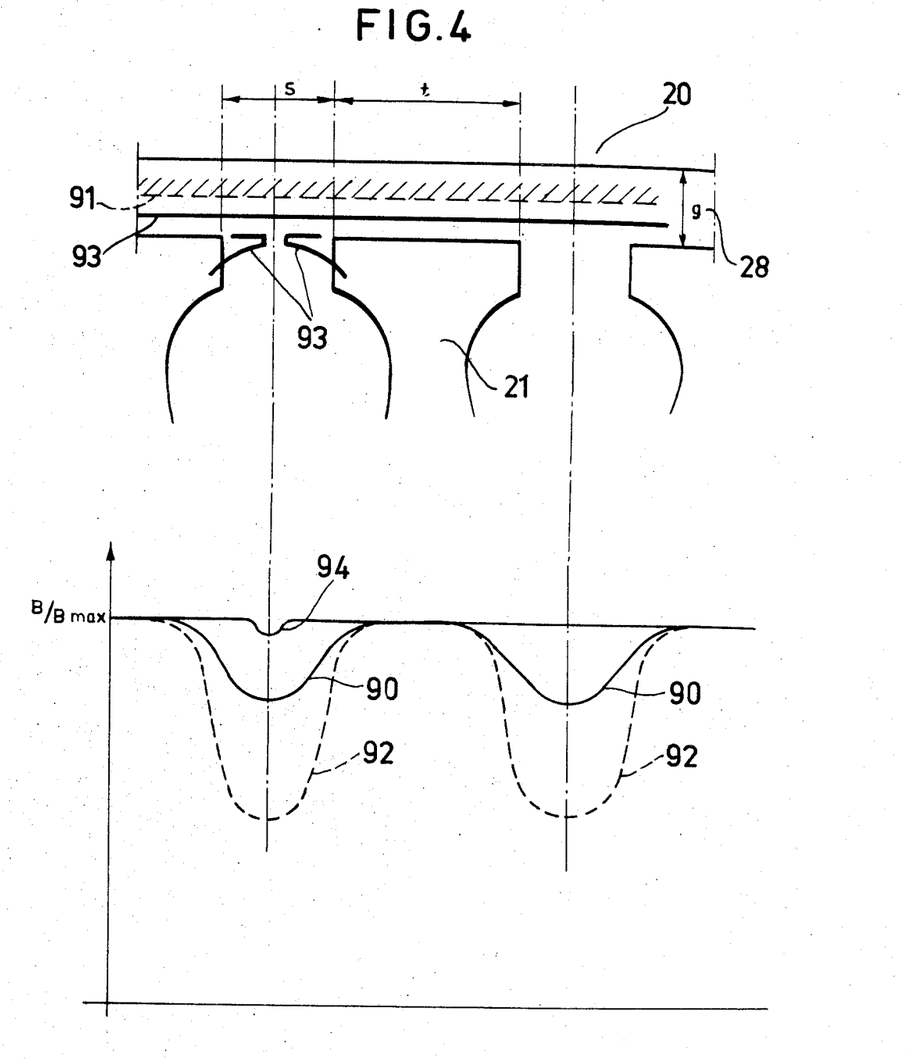
FIG. 4 shows diagrammatically the passage of the magnetic flux in the air gap of an electric motor.

FIG. 4 shows the passage of the magnetic flux from the stator teeth 21 over the air gap g into the rotor 20 as well as the corresponding flux curve. The said curve shows how remarkable depressions 90 in the flux curve occur at every slot opening s. These depressions cause motor noise and reduced total flux. The magnitude of the depressions is due to the ratio $s/g$. If g is reduced as to 91 at unchanged slot width s the total flux is increased, but unfortunately the depression becomes still more marked as at 92. In order to counteract this negative effect the slot width has to be reduced so that the ratio $s/g$ will be minimized. In FIG. 4 the air gap width g has been reduced to a minimum and at the same time the slot "throat" has been strongly modified, see full thick lines 93. Further increase of the total flux is obtained at the same time as the minimum depression on the flux curve. As a result a more powerful and silent motor is obtained.

Figure 5:
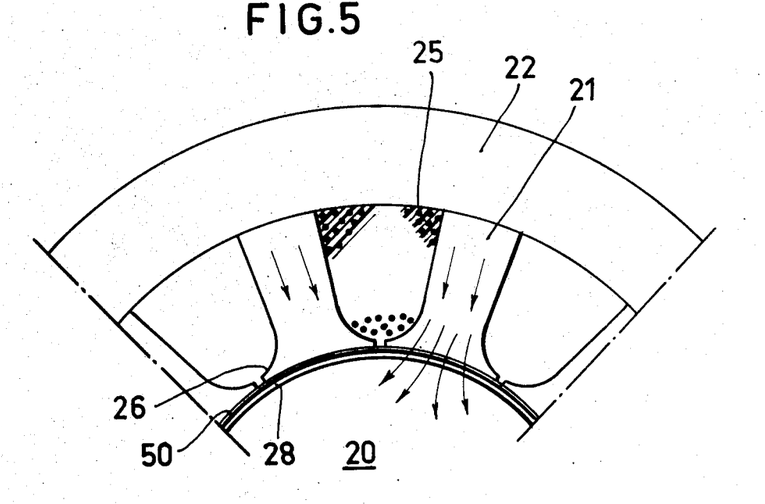
FIG. 5 shows the structure of a stator with a central sleeve member.

FIG. 5 shows diagrammatically a stator portion comprising the stator teeth 21 and surrounding ring-shaped yoke part 22. The lacquer mass 25 is a medium for keeping together the stator teeth, winding and stator yoke. The stator teeth are formed with the same flux optimized flank profile 26, which is described in connection with FIG. 3. The difference between the stators described with reference to FIG. 3 and FIG. 5 is that in the latter instance the air gap 28 between the stator portion and rotor 20 is partly filled out by a thin sleeve 50 of non-magnetic material. This sleeve is used as a fastening and aligning device for the stator teeth during the winding procedure and as a seal against the rotor cavity during the moulding-together of the stator, whereafter the end portion of the sleeve can be used as aligning and abutment surfaces when mounting a rotor bearing support.

Figure 6:
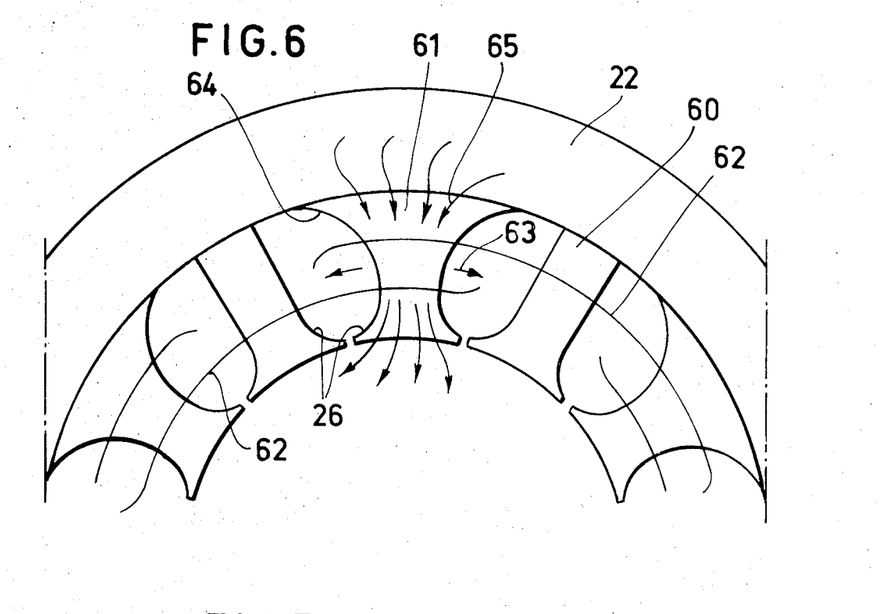
FIG. 6 shows diagrammatically spiral-formed stator teeth.

FIG. 6 is a diagrammatical view of a stator portion comprising the stator teeth 60 and 61 which are joined together with the surrounding ring-shaped yoke part 22 and with the winding coils 62 by means of moulding. As shown in the figure these winding coils engage several stator teeth (three) in such a way that the middle stator tooth 60 is not subjected to circumferential force by the winding coil 62, while the stator tooth 61 is subjected to circumferential forces in both directions as shown by the arrow 63. In order to facilitate the winding and to increase the filling of the winding slots, the stator teeth 61 are strongly curved outwards as at 64. This furthermore increases the contact surface against the stator yoke 22 and thus provides a better magnetic flux through the stator tooth as shown by the arrow 65. Inwards, towards the air gap by the rotor the flanks 26 of the stator teeth are formed in an optimized manner as described with reference to FIG. 3.

Figure 7:
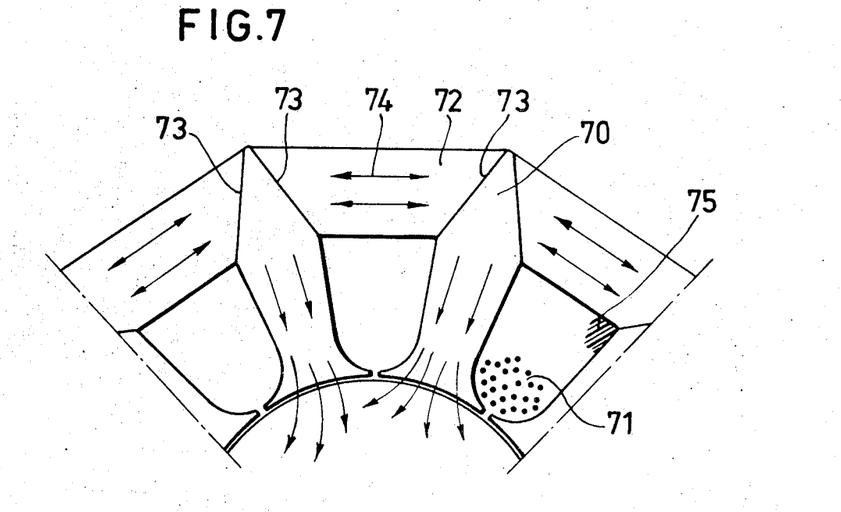
FIG. 7 shows diagrammatically the structure of a stator with stator teeth and split yoke-ring.

FIG. 7 is a diagrammatic view of a stator portion comprising stator teeth 70, winding 71 and a surrounding yoke part, which is divided in a number of segments 72 corresponding to the number of stator winding slots. The yoke segment 72 has a trapezoidal section in which the oblique flanks 73 have the same angle and are shaped to engage the radially extending stator teeth. The yoke segments may be assembled of laminations like the stator teeth. Advantageously flux oriented stator laminations may be used also in the yoke part as shown by the flux arrows 74. The whole stator unit with winding, stator teeth and stator yoke is assembled by means of moulding with lacquer or moulding mass 75.

Figures 8, 9:
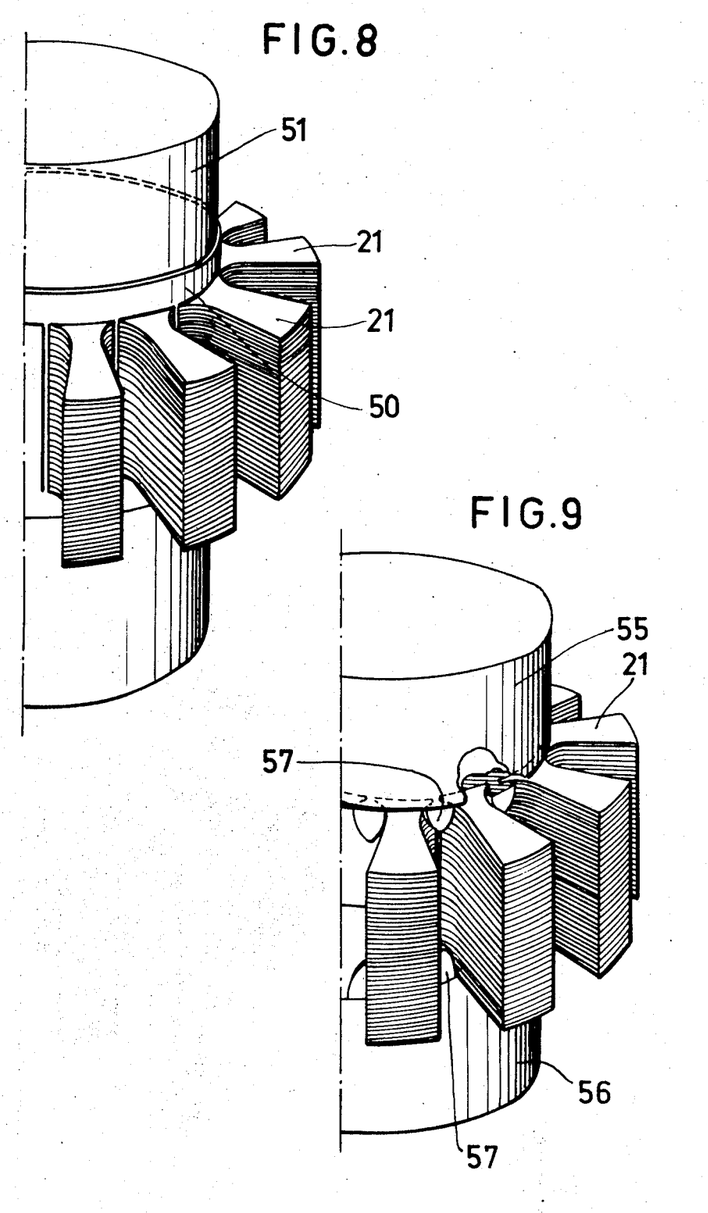
FIG. 8 is a partial view of stator teeth mounted on a sleeve and mandrel.
FIG. 9 is a partial view of stator teeth mounted directly on a central mandrel.

FIG. 8 is a fragmentary perspective view of a number of stator teeth 21 mounted on a central sleeve 50 which is supported by a central mandrel 51. After this assembly the winding procedure is carried out as shown in FIG. 10.

FIG. 9 is a fragmentary perspective view of a winding device according to the invention, where the stator teeth 21 by means of a two-part central mandrel 55 and 56 are fixed in a position suitable for the winding procedure. The mandrel halves are provided with suitably formed wedges 57, which fix the stator teeth in the intended position both axially, radially and peripherically during the winding and moulding operations after which the mandrel and wedge means are removed, the necessary guiding and abutment surfaces for supporting the rotor bearing assemblies being thereby provided.

Figures 10, 11:
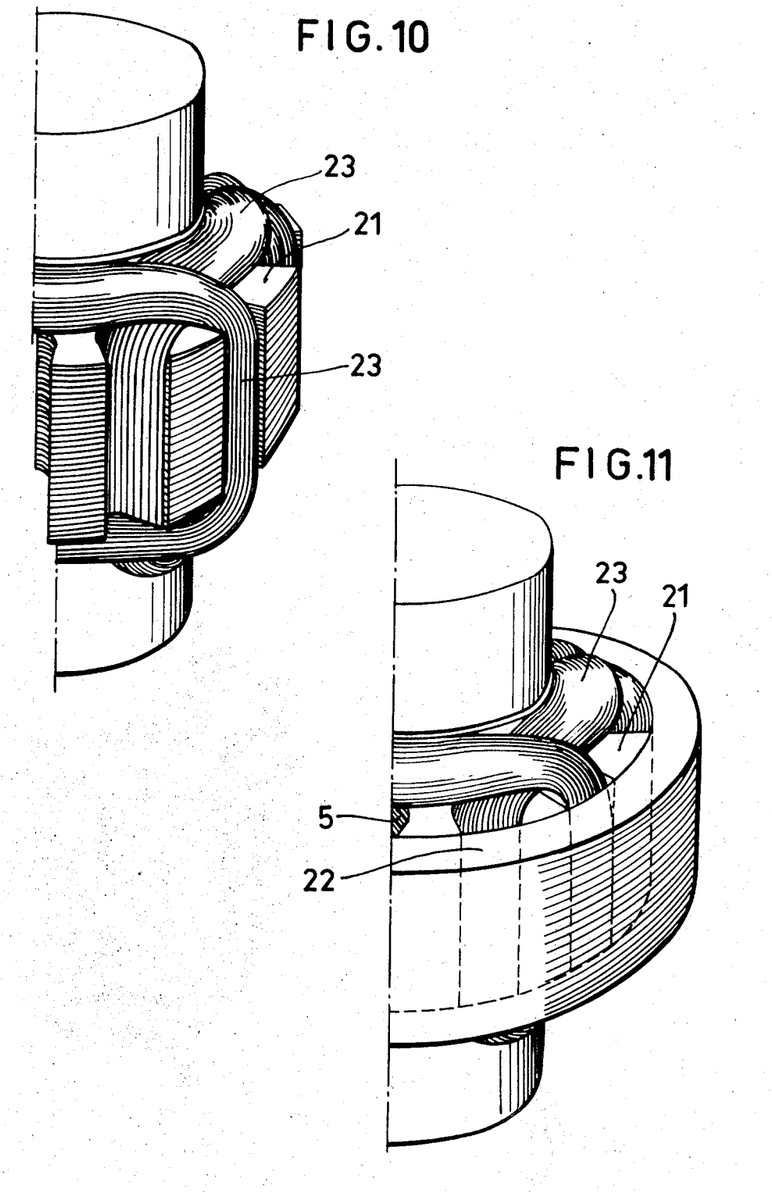
FIG. 10 is a partial view of the stator teeth with winding.
FIG. 11 is a partial view of the stator part shown in FIG. 10 with a surrounding ring-shaped yoke.

FIG. 10 is a fragmentary perspective view of the stator teeth 21 with mounted stator winding coils 23.

FIG. 11 is also a fragmentary perspective view of stator teeth 21 and a ring-shaped stator yoke 22. Around the stator windings 23, the stator teeth 21 and the stator yoke 22 there is applied moulded lacquer or moulding mass 5, so that a rigidly integrated stator unit is obtained.

Figure 12:
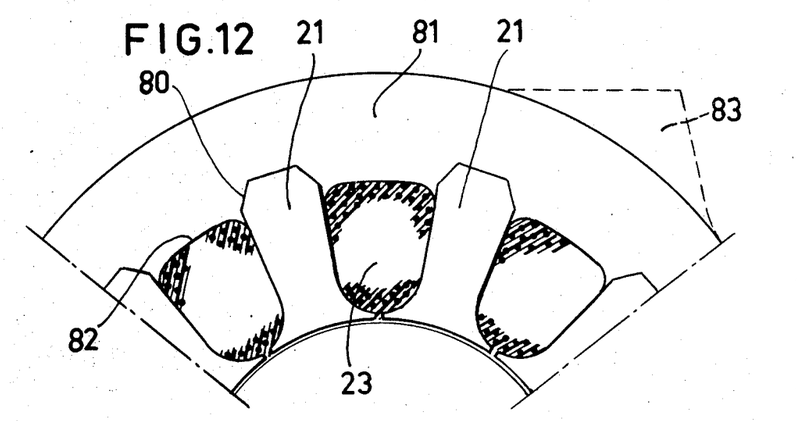
FIG. 12 shows diagrammatically how the stator teeth can be moulded in a magnetic plastic compound.

FIG. 12 shows diagrammatically how the stator teeth 21 are shaped towards their outer extremities to provide suitable fastening means 80 and suitable magnetic flux entrance from the surrounding yoke part 81, the latter being moulded of magnetic plastic material. In order to prevent the magnetic plastic material from penetrating into the winding coils 23 during the moulding operation, the coils may be protected outwards by means of a thin sheathing 82 of insulating material. Fastening means 83 may easily be fitted in the moulding die.

Figure 13:
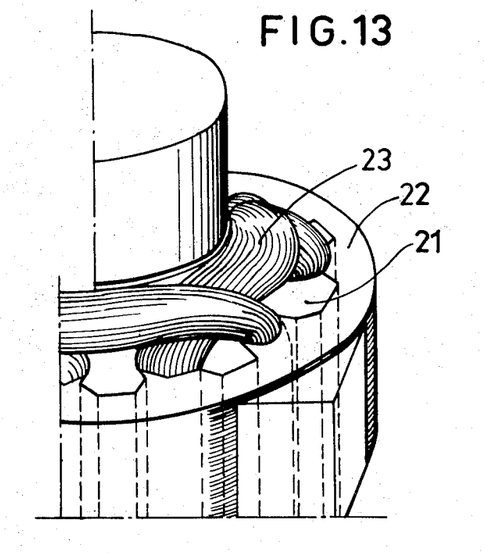
FIG. 13 is a partial view of a stator according to FIG. 11.

FIG. 13 is a fragmentary perspective view of a stator unit according to the principle outlined with reference to FIG. 12. The winding 23 and stator teeth 21 are moulded together into a unit by means of the surrounding yoke part 22 of magnetic plastic material. As far as the flux is concerned the magnetic plastic material is clearly inferior to the flux oriented laminations, but in spite of that it may be economically acceptable in certain motor types to replace the expensive yoke part by magnetic moulded plastic. Of course steps may be taken to compensate the dimensions, e.g., increase the shoulder height of the yoke.

Figure 14:
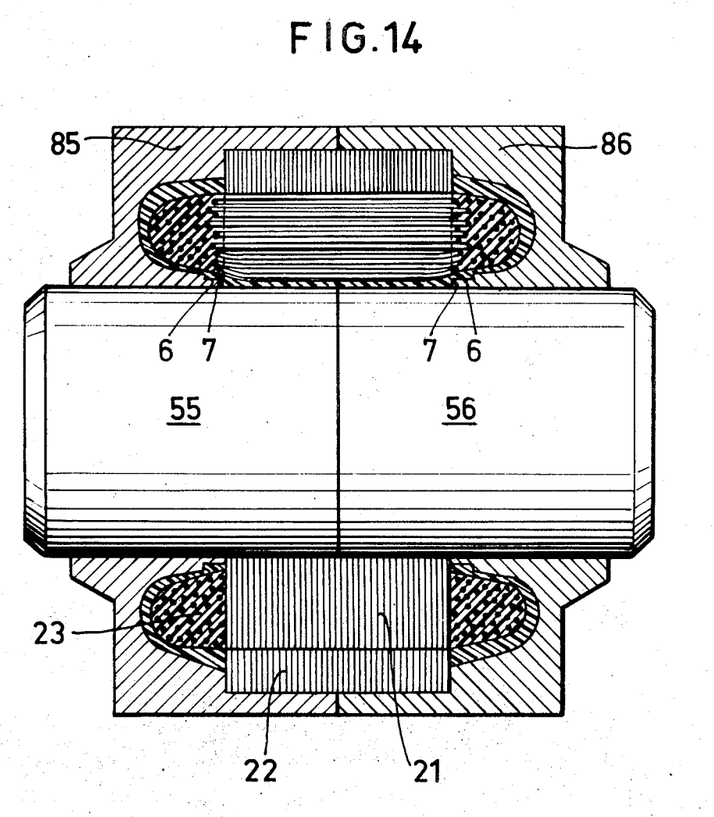
FIG. 14 is a diagrammatical longitudinal section view of a stator and a moulding die.

FIG. 14 shows very diagrammatically how a moulding die may be arranged around the stator teeth 21, the yoke part 22 and the winding 23 according to that embodiment of the invention illustrated in FIGS. 1 and 3. The central mandrels 55 and 56 are enclosed by two moulding die halves 85 resp. 86 which also enclose the stator elements and axially align the latter. Thereby axial abutment surfaces 7 for bearing support means are formed with accurate spacing from each other, while alignment surfaces 6 are formed coaxially with the rotor cavity of the stator.

I claim:

1. An electric rotary machine having a stator and a rotor, an annular air gap between the stator and the rotor, said stator comprising an outer annular yoke and a plurality of radially directed stator teeth circumferentially spaced apart to define a plurality of openings between adjacnet teeth and extending the full radial depth of the teeth, and which are open in radially outward directions, stator windings in the openings between the stator teeth and moulding adjacent axial ends of the stator forming an insulation for the stator windings and locating and holding together the stator teeth and stator windings as a rigid assembly, the inner ends of said teeth being formed with pointed tooth shoulders wherein adjacent shoulders are closely spaced apart to provide a narrow gap therebetween, said stator yoke and stator teeth being joined together with a moulding compound.

2. An electric rotary machine as claimed in claim 1 wherein said moulding includes aligning and abutment surfaces for bearing support members in the stator end surface radially inside the stator end windings.

* * * * *

UNITED STATES PATENT OFFICE
CERTIFICATE OF CORRECTION

Patent No. 3,792,299  Dated February 12, 1974

Inventor(s) Stig Lennart Hallerback

It is certified that error appears in the above-identified patent and that said Letters Patent are hereby corrected as shown below:

Please insert --

Foreign Application Priority Data

May 18, 1971  Sweden ..........6444/71.

Signed and sealed this 10th day of September 1974.

(SEAL)
Attest:

McCOY M. GIBSON, JR.
Attesting Officer

C. MARSHALL DANN
Commissioner of Patents